(12) United States Patent
Sears et al.

(10) Patent No.: US 11,880,103 B2
(45) Date of Patent: *Jan. 23, 2024

(54) PHOTOCHROMIC DYE AND LIQUID CRYSTAL OPTICAL ELEMENT

(71) Applicant: Meta Platforms Technologies, LLC, Menlo Park, CA (US)

(72) Inventors: Jasmine Soria Sears, Kirkland, WA (US); Afsoon Jamali, Redmond, WA (US); Yun-Han Lee, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 17/709,791

(22) Filed: Mar. 31, 2022

(65) Prior Publication Data

US 2022/0221754 A1 Jul. 14, 2022

Related U.S. Application Data

(63) Continuation of application No. 16/854,181, filed on Apr. 21, 2020, now Pat. No. 11,320,684.

(Continued)

(51) Int. Cl.
*G02F 1/1333* (2006.01)
*G02F 1/137* (2006.01)
(Continued)

(52) U.S. Cl.
CPC ...... *G02F 1/133382* (2013.01); *G02F 1/0126* (2013.01); *G02F 1/137* (2013.01);
(Continued)

(58) Field of Classification Search
CPC .. G02F 1/137; G02F 1/0126; G02F 1/133382; G02F 1/133308
See application file for complete search history.

(56) References Cited

U.S. PATENT DOCUMENTS 10,852,552 B2 12/2020 Kimura et al.
11,320,684 B2 * 5/2022 Sears ............... G02F 1/137
(Continued)

FOREIGN PATENT DOCUMENTS

WO 0077559 A1 12/2000

OTHER PUBLICATIONS

Co-pending U.S. Appl. No. 16/573,061, inventors Nathan; Matsuda et al., filed Sep. 17, 2019.

(Continued)

*Primary Examiner* — Dung T Nguyen
(74) *Attorney, Agent, or Firm* — FREESTONE INTELLECTUAL PROPERTY LAW PLLC; Aaron J. Visbeek

(57) ABSTRACT

An optical element includes a first boundary layer and a second boundary layer. A solution is disposed between the first boundary layer and the second boundary layer. The solution includes liquid crystals co-mingled with oblong photochromic dye molecules. The photochromic dye molecules are matched to the liquid crystals to offset a decrease in absorption of the photochromic dye molecules in response to a temperature increase of the photochromic dye molecules.

20 Claims, 7 Drawing Sheets

Related U.S. Application Data

(60) Provisional application No. 62/911,211, filed on Oct. 5, 2019.

(51) Int. Cl.
  *G02F 1/01* (2006.01)
  *G02B 27/01* (2006.01)

(52) U.S. Cl.
  CPC .... *G02F 1/133308* (2013.01); *G02B 27/0172* (2013.01); *G02F 2202/14* (2013.01)

(56) References Cited

U.S. PATENT DOCUMENTS

| | | |
|---|---|---|
| 2004/0090570 A1 | 5/2004 | Kosa et al. |
| 2007/0139519 A1 | 6/2007 | DeCusatis et al. |
| 2015/0212326 A1 | 7/2015 | Kress et al. |
| 2016/0070132 A1 | 3/2016 | Soto et al. |
| 2016/0212888 A1 | 7/2016 | Nikkhoo et al. |
| 2020/0111258 A1 | 4/2020 | Sears et al. |

OTHER PUBLICATIONS

Co-pending U.S. Appl. No. 16/792,173, inventors Jasmine; Sears et al., filed Feb. 14, 2020.
Co-pending U.S. Appl. No. 16/849,853, inventors Matthieu; Charles Raoul Leibovici et al., filed Apr. 15, 2020.
Co-pending U.S. Appl. No. 16/849,859, inventors Matthieu; Charles Raoul Leibovici et al., filed Apr. 15, 2020.
International Search Report and Written Opinion for International Application No. PCT/US2020/049612, dated Dec. 1, 2020, 11 Pages.
Non-Final Office Action dated Mar. 18, 2021 for U.S. Appl. No. 16/854,181, filed Apr. 21, 2020, 8 Pages.
Notice of Allowance dated Jan. 21, 2022 for U.S. Appl. No. 16/854,181, filed Apr. 21, 2020, 8 pages.
Restriction Requirement dated Feb. 4, 2021 for U.S. Appl. No. 16/854,181, filed Apr. 21, 2020, 6 Pages.

\* cited by examiner

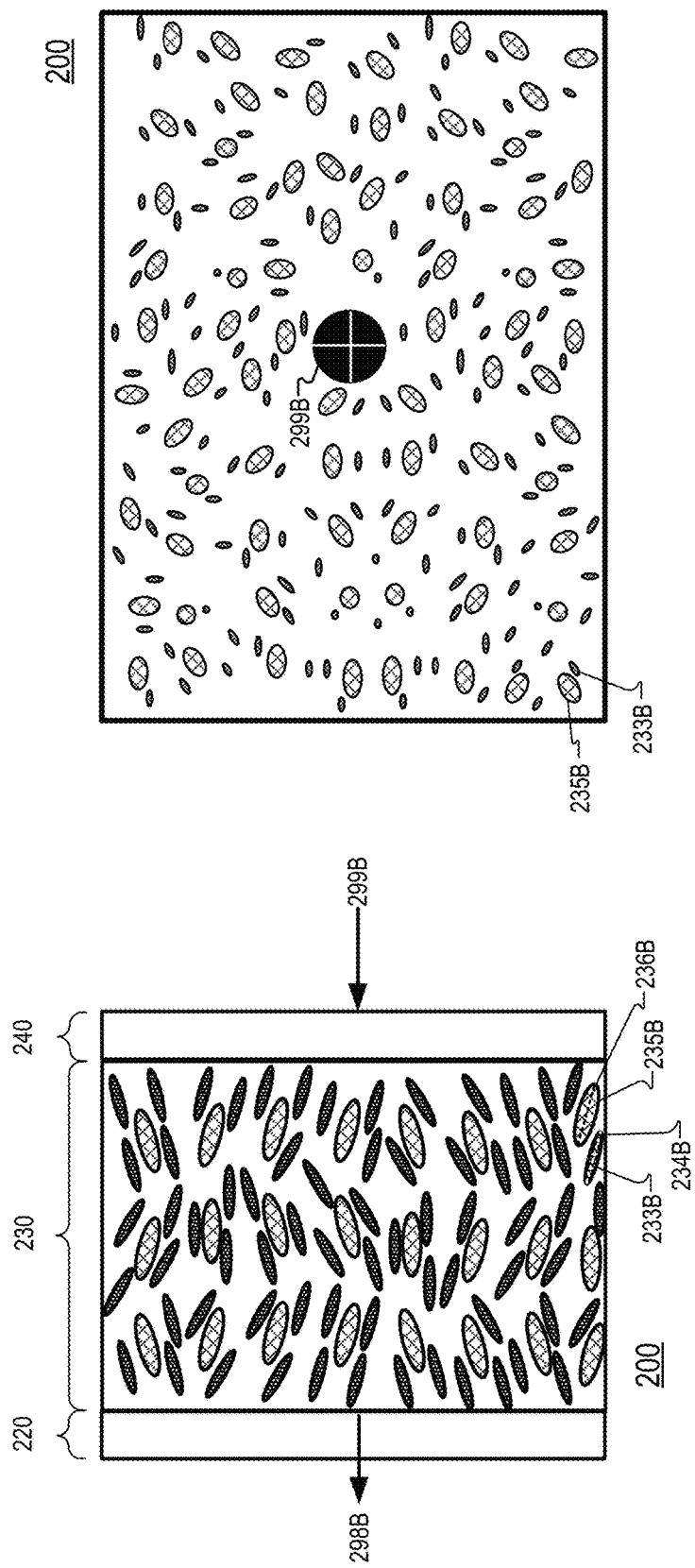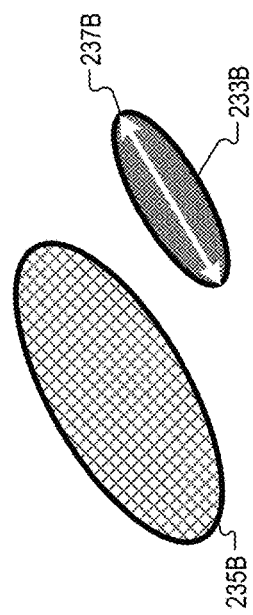
FIG. 3A
FIG. 3B
FIG. 3C

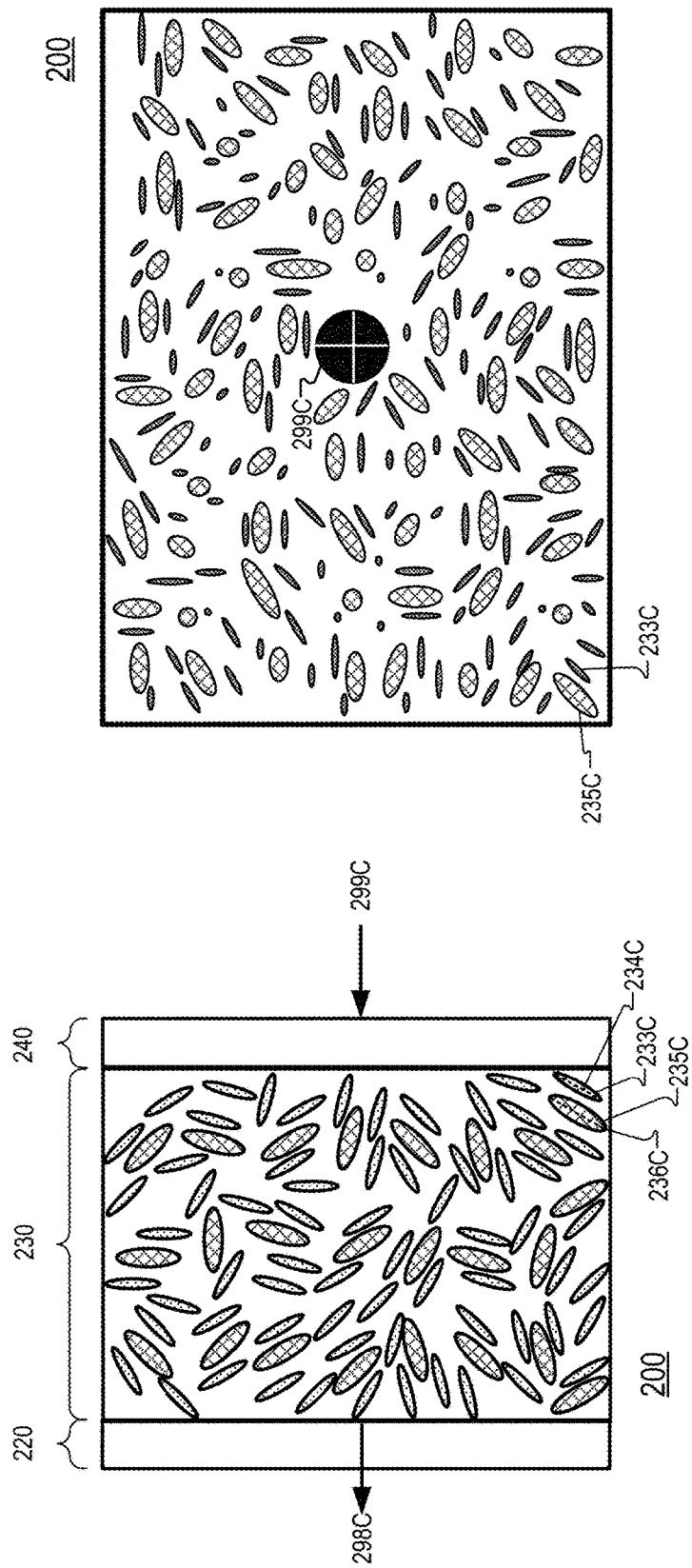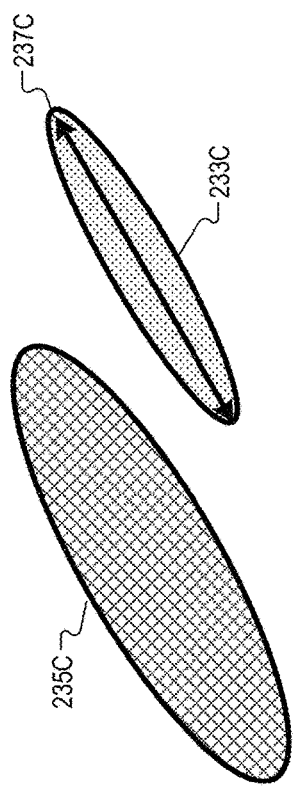
FIG. 4A
FIG. 4B
FIG. 4C

PHOTOCHROMIC DYE AND LIQUID CRYSTAL OPTICAL ELEMENT

CROSS-REFERENCE TO RELATED APPLICATIONS

This application claims priority to U.S. non-provisional application Ser. No. 16/854,181 filed Apr. 21, 2020, which claims priority to U.S. provisional Application No. 62/911,211 filed Oct. 5, 2019. U.S. non-provisional application Ser. No. 16/854,181 and U.S. provisional application 62/911,211 are incorporated by reference herein.

BACKGROUND INFORMATION

Photochromic lenses are commonly used in both prescription glasses and non-prescription sunglasses. In some photochromic lenses, photochromic molecules included in the lenses reduce transmission of incident light through the lens (darkening) in response to ultraviolet light, for example. Yet, in certain thermal environments, non-uniform darkening of the photochromic lenses may become readily apparent due to a changing transparency of photochromic molecules with respect to temperature.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIGS. 3A-3C illustrate an alignment of liquid crystals at a second temperature and a transmission characteristic of oblong photochromic dye molecules at the second temperature, in accordance with an embodiment of the disclosure.

FIGS. 4A-4C illustrate an alignment of liquid crystals at a third temperature and a transmission characteristic of oblong photochromic dye molecules at the third temperature, in accordance with an embodiment of the disclosure.

DETAILED DESCRIPTION

Figure 1:
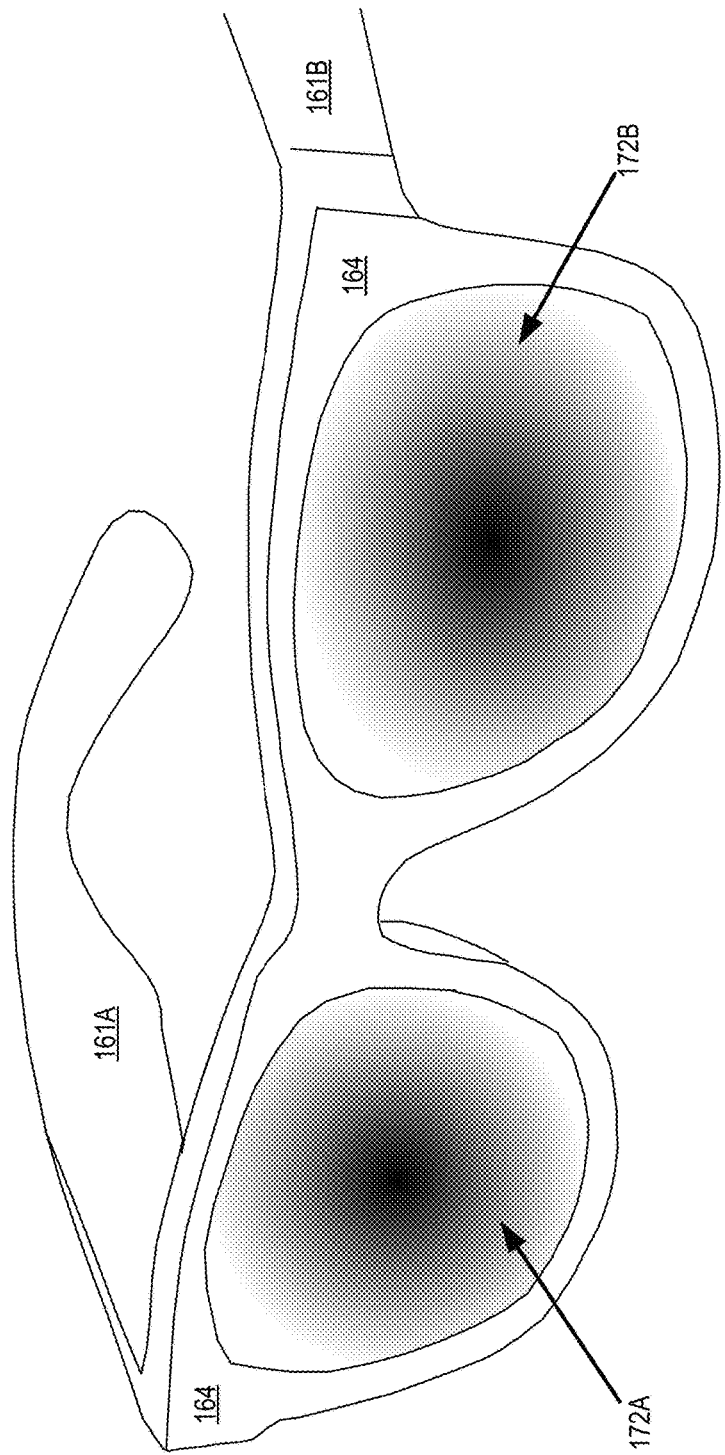
FIG. 1 illustrates glasses that include photochromic lenses.

Embodiments of a photochromic optical element are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some embodiments of the disclosure, "near-eye" may be defined as including an optical element that is configured to be placed within 35 mm of an eye of a user while a near-eye optical device such as a head mounted device or head mounted display (HMD) is being utilized.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.4 µm.

In aspects of this disclosure, the term "transparent" may be defined as having greater than 90% transmission of light. In some aspects, the term "transparent" may be defined as a material having greater than 90% transmission of visible light.

Embodiments of this disclosure may improve photochromic absorption consistency when an optical element has a thermal gradient. Absorption dyes (photochromic molecules) used in photochromic elements may lose absorption when they get warmer. A lens in a head mounted display (HMD), for example, often gets hotter around the edge and so the absorption around the edge of a photochromic lens is less than the colder middle of the lens. To address this, oblong photochromic dye molecules may be co-mingled with liquid crystals in a solution. Some liquid crystals become disordered in alignment in response to heat. Oblong photochromic dye molecules may tend to align with the disordered liquid crystals which may increase the exposed cross-section of the oblong photochromic molecules that is exposed to incoming light (increasing the absorption). An optical element may include a photochromic cell where oblong photochromic dye molecules are co-mingled with liquid crystals. In embodiments of the disclosure, the disordered alignment characteristics of the liquid crystal may offset or partially offset the decreased dye absorption caused by heat by increasing the exposed cross-section of the oblong photochromic dye molecules that align with the liquid crystals. Consequently, the optical element (e.g. a photochromic lens) may have a uniform or substantially uniform transmission profile across the optical element even when there is a thermal gradient across the optical element.

In one embodiment, the photochromic optical element is passive and relies on the disordered nature of liquid crystal in response to temperature paired with the oblong photochromic dye molecules to generate the more uniform transmission through the optical element.

In an embodiment, one or more active shutters are utilized to actively drive the optical element to minimum absorption orientation or maximum absorption orientation to control the transmission of light. The active shutter embodiment may include one or more photochromic cells that includes oblong photochromic dye molecules co-mingled with liquid crystals. The photochromic cell may be disposed between two electrode layers that may be transparent to visible light (e.g. indium tin oxide). The electrode layers may be driven digitally (OFF or ON) or may be driven to provide more granular grey-scale control in order to more finely control the transmission through the optical element. Actively driving the one or more active shutters may provide more uniform transmission control through the optical element regardless of a temperature gradient across the optical element. These and other embodiments are described in more detail in connection with FIGS. 1-7.

FIG. 1 illustrates glasses 199 that include photochromic lenses 172A and 172B (referred to collectively as lenses 172). Glasses 199 include arms 161A and 161B coupled to a frame 164. Photochromic optical elements 172A and 172B are included in frame 164. FIG. 1 shows that photochromic optical elements 172 are more transmissive on the outside of the photochromic elements 172 when the outside of the photochromic optical elements have a higher temperature than the middle (darkest) part of photochromic optical elements 172. If glasses 199 are a head mounted device or "smart glasses," heat dissipating from batteries, power supplies, processors, or otherwise may contribute to a thermal gradient across photochromic optical elements 172. In some contexts, the outside edge of photochromic optical elements 172 may be 10° C. warmer (or more) than a middle of photochromic optical elements 172 that translates into a thermal gradient that increases in temperature as a position of the photochromic optical element 172 goes toward an outside boundary (edge) of the photochromic optical element that is proximate to (or contacting) the frame 164.

Figure 2B:
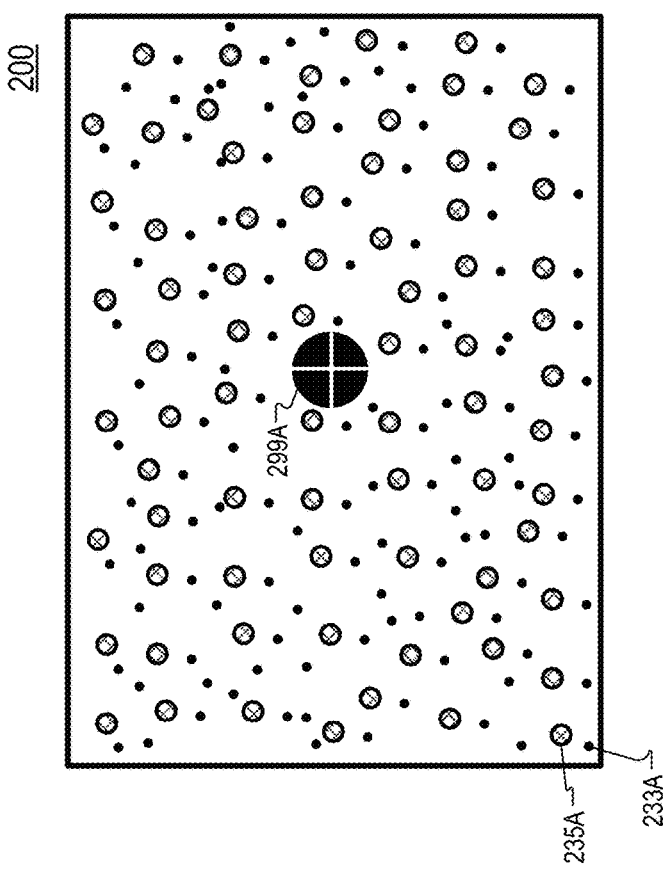
FIGS. 2A-2C illustrate an example optical element including a solution of liquid crystals co-mingled with oblong photochromic dye molecules, in accordance with an embodiment of the disclosure.
Figure 2C:
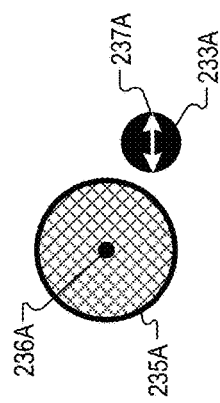
Figure 2A:
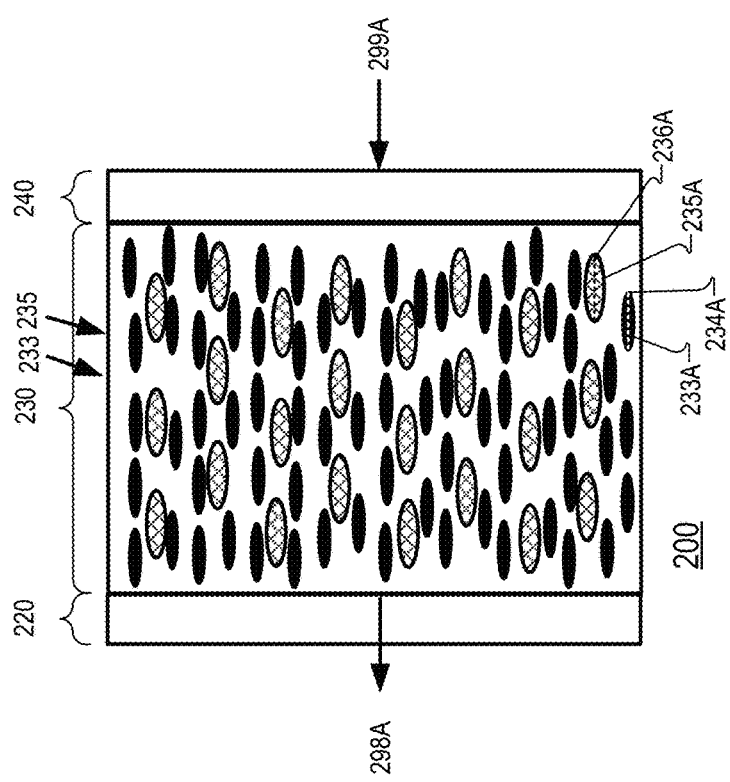

FIGS. 2A-2C illustrate an example optical element 200 including a solution of liquid crystals co-mingled with oblong photochromic dye molecules, in accordance with aspects of the disclosure. FIG. 2A illustrates a top view of a portion of an optical element 200 that includes a first boundary layer 220, a second boundary layer 240, and a solution 230 disposed between the first boundary layer 220 and the second boundary layer 240. When optical element 200 is fabricated for use with glasses, first boundary layer 220 may be referred to as an eyeward transparent boundary layer and second boundary layer 240 may be referred to as a scene-side transparent boundary layer. Optical element 200 may be a near-eye optical element. Solution 230 includes a plurality of liquid crystals 235 co-mingled with oblong photochromic dye molecules 233. FIGS. 2A-4C depict liquid crystals 235 and oblong photochromic dye molecules 233 at a function level and may not necessarily be drawn to scale. Furthermore, the concentration of liquid crystals 235 and oblong photochromic dye molecules 233 may vary from the illustration, in actual implementation.

FIG. 2A illustrates an alignment of liquid crystals 235 at a first temperature and a transmission characteristic of oblong photochromic dye molecules 233 at that same first temperature. The first temperature may be 20° C., for example. The first temperature may be 25° C., in some embodiments. The first temperature may be 30° C. or more, in some embodiments.

At the first temperature, the long axis 236A of the liquid crystals 235 are self-aligned approximately normal to eyeward transparent boundary layer 220 and scene-side transparent boundary layer 240. Liquid crystals 235 may be rod-shaped liquid crystals to facilitate self-alignment of long axis 236A normal to eyeward transparent boundary layer 220 and scene-side transparent boundary layer 240. Oblong photochromic dye molecules 233 are configured to align with the liquid crystals 235 so that a long axis 234A of the oblong photochromic dye molecules 233 will generally align with the long axis 236A of liquid crystals 235 that are proximate to a particular oblong photochromic dye molecule 233. In the particular illustration of FIG. 2A, long axis 236A of liquid crystal 235A is positioned approximately in parallel with the long axis 234A of oblong photochromic dye molecule 233A, for example.

In FIG. 2A, incoming light 299A is incident upon scene-side transparent layer 240 approximately normal to the scene-side transparent layer 240. As incoming light 299A propagates through solution 230, a portion of incoming light 299A is absorbed by oblong photochromic dye molecules 233. A remaining portion of incoming light 299A that is not absorbed by oblong photochromic dye molecules 233 exits optical element 200 as remaining light 298A. In FIGS. 2A-2C, oblong photochromic dye molecule 233 are illustrated having a solid black fill to represent a high-absorption characteristics of oblong photochromic dye molecules 233 at the first temperature. Notably, the solid black fill may represent the relative aggregate transmission characteristics of oblong photochromic dye molecules 233 in FIGS. 2A-2C as a whole since individual molecules 233 may be either in a fully absorbing or fully clear (transmissive) state, in some implementations.

FIG. 2B illustrates a front view of a portion of optical element 200 at the first temperature. FIG. 2B depicts incoming light 299A going into-the-page encountering scene-side transparent boundary layer 240 approximately normal to scene-side transparent boundary layer 240 and propagating through solution 230 and eyeward transparent boundary layer 220. Notably, since liquid crystals 235 are aligned approximately normal to scene-side transparent boundary layer 240, a cross-section of liquid crystals 235 and a cross-section of oblong photochromic dye molecules 233 (aligned with the liquid crystals 235) approach the smallest possible cross-section of the liquid crystals 235 and approach the smallest possible cross-section of the oblong photochromic dye molecules 233 exposed to incoming light 299A. Therefore, although the oblong photochromic dye molecules 233 have high-absorption at the first temperature, the cross-section of the oblong photochromic dye molecules 233 is relatively small.

FIG. 2C illustrates a zoomed-in view of an example liquid crystal 235A and an example oblong photochromic dye molecule 233A that illustrate the small cross-section of liquid crystals 235 and the corresponding small cross-section 237 of oblong photochromic dye molecule 233A facing incoming light 299A to absorb incoming light 299A. FIG. 2C shows that the long axis 236A of example liquid crystal 235A is into-the-page. As discussed above, a concentration of oblong photochromic dye molecules 233 may be different (e.g. much more concentrated) than illustrated.

FIG. 3A illustrates an alignment of liquid crystals 235 at a second temperature and a transmission characteristic of oblong photochromic dye molecules 233 at the second temperature. The second temperature is warmer than the first temperature. The second temperature may be 5° C. warmer than the first temperature, for example.

At the second temperature, the long axis 236B of the liquid crystals 235 are no longer self-aligned to be oriented normal to eyeward transparent boundary layer 220 and scene-side transparent boundary layer 240. Rather, at the second temperature in FIG. 3A, liquid crystals 235 are slightly disordered due to the increased temperature of the second temperature. Since the liquid crystals 235 are slightly disordered, the long axis 236 of the liquid crystals 235 are no longer substantially aligned and therefore the long axis 234B of the oblong photochromic dye molecules 233 are no longer oriented normal to scene-side transparent boundary layer 240 and eyeward transparent boundary layer 220.

In FIG. 3A, incoming light 299B is incident upon scene-side transparent layer 240 approximately normal to the scene-side transparent layer 240. As incoming light 299B propagates through solution 230, a portion of incoming light 299B is absorbed by oblong photochromic dye molecules 233. A remaining portion of incoming light 299B that is not absorbed by oblong photochromic dye molecules 233 exits optical element 200 as remaining light 298B. In FIGS. 3A-3C, oblong photochromic dye molecule 233 are illustrated having a speckled fill to represent a mid-absorption characteristic of oblong photochromic dye molecules 233 at the second temperature. Here again, the speckled fill may represent the relative aggregate transmission characteristics of oblong photochromic dye molecules 233 in FIGS. 3A-3C as a whole since individual molecules 233 may be either in a fully absorbing or fully clear (transmissive) state, in some implementations.

FIG. 3B illustrates a front view of a portion of optical element 200 at the second temperature. FIG. 3B depicts incoming light 299B going into-the-page encountering scene-side transparent boundary layer 240 approximately normal to scene-side transparent boundary layer 240 and propagating through solution 230 and eyeward transparent boundary layer 220. Since liquid crystals 235 are slightly disordered at the second temperature, a greater cross-section of the oblong photochromic dye molecules 233 (also slightly disordered due to their aligning with the slightly disordered liquid crystals 235) faces incoming light 299B and therefore incoming light 299B encounters a larger cross-section of oblong photochromic dye molecules 233 as incoming light 299B propagates through solution 230. However, the larger cross-section of oblong photochromic dye molecules 233 that faces incoming light 299B at the second temperature (attributed to the slight disorder of liquid crystals 235 at the second temperature) is offset (or balanced) by the reduced absorption of oblong photochromic dye molecules 233B. Consequently, the intensity of remaining light 298B may be the same as the intensity of remaining light 298A.

FIG. 3C illustrates a zoomed-in view of an example liquid crystal 235B and an example oblong photochromic dye molecule 233B that illustrate the greater cross-section of liquid crystals 235 and the corresponding medium cross-section 237B of oblong photochromic dye molecule 233B facing incoming light 299B to absorb incoming light 299B.

FIG. 4A illustrates an alignment of liquid crystals 235 at a third temperature and a transmission characteristic of oblong photochromic dye molecules 233 at the third temperature. The third temperature is warmer than the second temperature. The third temperature may be 5° C. warmer than the second temperature, for example.

At the third temperature, the long axis 236C of the liquid crystals 235C are not self-aligned to be oriented normal to eyeward transparent boundary layer 220 and scene-side transparent boundary layer 240. Rather, at the third temperature in FIG. 4A, liquid crystals 235 are disordered due to the increased temperature of the third temperature. Since the liquid crystals 235 are disordered, the long axis of the liquid crystals 235 are not aligned and therefore the long axis 234C of the oblong photochromic dye molecules 233 are not normal to scene-side transparent boundary layer 240 and eyeward transparent boundary layer 220.

In FIG. 4A, incoming light 299C is incident upon scene-side transparent layer 240 approximately normal to the scene-side transparent layer 240. As incoming light 299C propagates through solution 230, a portion of incoming light 299C is absorbed by oblong photochromic dye molecules 233. A remaining portion of incoming light 299C that is not absorbed by oblong photochromic dye molecules 233 exits optical element 200 as remaining light 298C. In FIG. 4A, oblong photochromic dye molecule 233 are illustrated having a sparse fill to represent a low-absorption characteristic of oblong photochromic dye molecules 233 at the third temperature. As noted in connection with FIGS. 2A-3C, the sparse fill may represent the relative aggregate transmission characteristics of oblong photochromic dye molecules 233 in FIGS. 4A-4C as a whole since individual molecules 233 may be either in a fully absorbing or fully clear (transmissive) state, in some implementations.

FIG. 4B illustrates a front view of a portion of optical element 200 at the third temperature. FIG. 4B depicts incoming light 299C going into-the-page encountering scene-side transparent boundary layer 240 approximately normal to scene-side transparent boundary layer 240 and propagating through solution 230 and eyeward transparent boundary layer 220. Since liquid crystals 235 are disordered at the third temperature, a greater cross-section of the oblong photochromic dye molecules 233 (also disordered due to their aligning with the disordered liquid crystals 235) faces incoming light 299C and therefore incoming light 299C encounters a very large cross-section of oblong photochromic dye molecules 233 as incoming light 299C propagates through solution 230. However, the very large cross-section of oblong photochromic dye molecules 233 that face incoming light 299C at the third temperature (attributed to the disorder of liquid crystals 235 at the third temperature) is offset (or balanced) by the reduced absorption of oblong photochromic dye molecules 233 at the third temperature. Consequently, the intensity of remaining light 298C may be the same as the intensity of remaining light 298B and remaining light 298A.

FIG. 4C illustrates a zoomed-in view of an example liquid crystal 235C and an example oblong photochromic dye molecule 233C that illustrate the very large cross-section of liquid crystals 235C and the corresponding large cross-section 237C of oblong photochromic dye molecule 233C facing incoming light 299C to absorb incoming light 299C.

Figure 5:
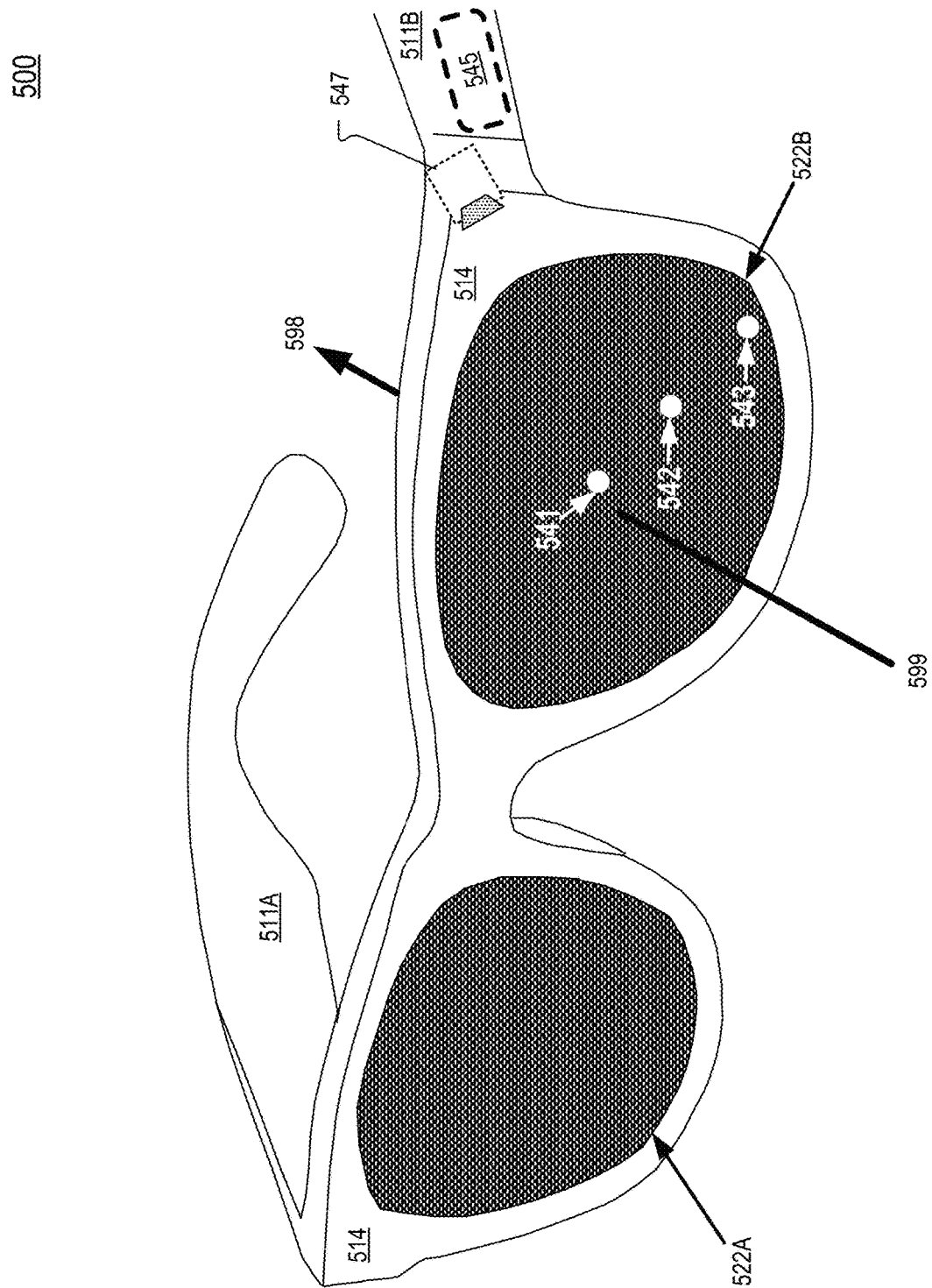
FIG. 5 illustrates a head mounted device that includes photochromic optical elements, in accordance with an embodiment of the disclosure.

FIG. 5 illustrates a head mounted device 500 that includes photochromic optical elements 522A and 522B (referred to collectively as optical elements 522) that include the structure of optical element 200, in accordance with aspects of the disclosure. Head mounted device 500 may be considered to be "electronic glasses" or "smart glasses," in some contexts. Head mounted device 500 includes electronic such as processing logic 545 and element 547. Element 547 may be a camera, in some embodiments. Head mounted device 500 may also include additional electronic elements (not illustrated) such as a battery, network communication chipsets (e.g. IEEE 802.11x wireless interface), power converters (e.g. switching power supplies), and otherwise. The electronics included in head mounted device 500 may be disposed in arms 511A and 511B and frame 514 that is coupled to arms 511A and 511B.

The heat dissipated by these electronics may be conducted into photochromic optical elements 522A and 522B that increases the temperature of photochromic optical elements 522 that may otherwise have a temperature that is similar to the ambient air temperature. Consequently, a temperature gradient may exist across photochromic optical elements 522. In some embodiments, this temperature gradient increases in temperature as a position of the photochromic optical element goes toward an outside boundary (edge) of the photochromic optical element that is proximate to (or contacting) the frame 164. FIG. 5 illustrates a first coordinate 541, a second coordinate 542, and a third coordinate 543. First coordinate 541 is approximately in a middle or center of photochromic optical element 522B and third coordinate 543 is very close to an outside edge of the photochromic optical element 522B. Second coordinate 542 is disposed approximately midway between first coordinate 541 and third coordinate 543. While not specifically illustrated, those skilled in the art appreciate that similar thermal gradients may exist across photochromic optical element 522A.

First coordinate 541 may be at the first temperature (e.g. 25° C.) and optical element 522B at first coordinate 541 may have an associated orientation of liquid crystals 235 and corresponding orientation of oblong photochromic dye molecules 233 as illustrated in FIGS. 2A-2C. Third coordinate 543 may be at the third temperature (e.g. 35° C.) and optical element 522B at third coordinate 543 may have an associated orientation of liquid crystals 235 and corresponding orientation of oblong photochromic dye molecules 233 as illustrated in FIGS. 4A-4C. Second coordinate 542 may be at the second temperature (e.g. 30° C.) and optical element 522B at second coordinate 542B may have an associated orientation of liquid crystals 235 and corresponding orientation of oblong photochromic dye molecules 233 illustrated in FIGS. 3A-3C. Yet, even as coordinates 541, 542, and 543 experience different temperatures, the transmission of incoming light 599 is approximately equal across photochromic optical element 522B, just as the intensities of remaining light 298A, 298B, and 298C may be the same through optical element 200 over different temperature ranges. Hence, photochromic optical elements 522A and 522B are illustrated with a substantially uniform darkening because the liquid crystals 235 are configured to become increasingly disordered in response to increased temperature and the oblong photochromic dye molecules 233 are configured to align with the liquid crystals 235 and increase the cross section of the oblong photochromic dye molecules with respect to incoming light 599 (as the liquid crystals 235 increase in disorder).

The oblong photochromic dye molecules 233 may be matched to the liquid crystals 235 to offset a decrease in absorption of the oblong photochromic dye molecules 233 in response to increased temperature such that a transmission of the incoming light 599 is approximately equal across photochromic optical element 522B when a temperature gradient exists across the photochromic optical element. In other words, the remaining light 598 (portion of the incoming light 599 that is not absorbed or otherwise scattered) may have approximately the same intensity regardless of the coordinate of incidence of the incoming light 599 upon photochromic optical element 522B. A first refractive index of liquid crystals 235 may be substantially equal to a second refractive index of the oblong photochromic dye molecules 233.

Figure 6:
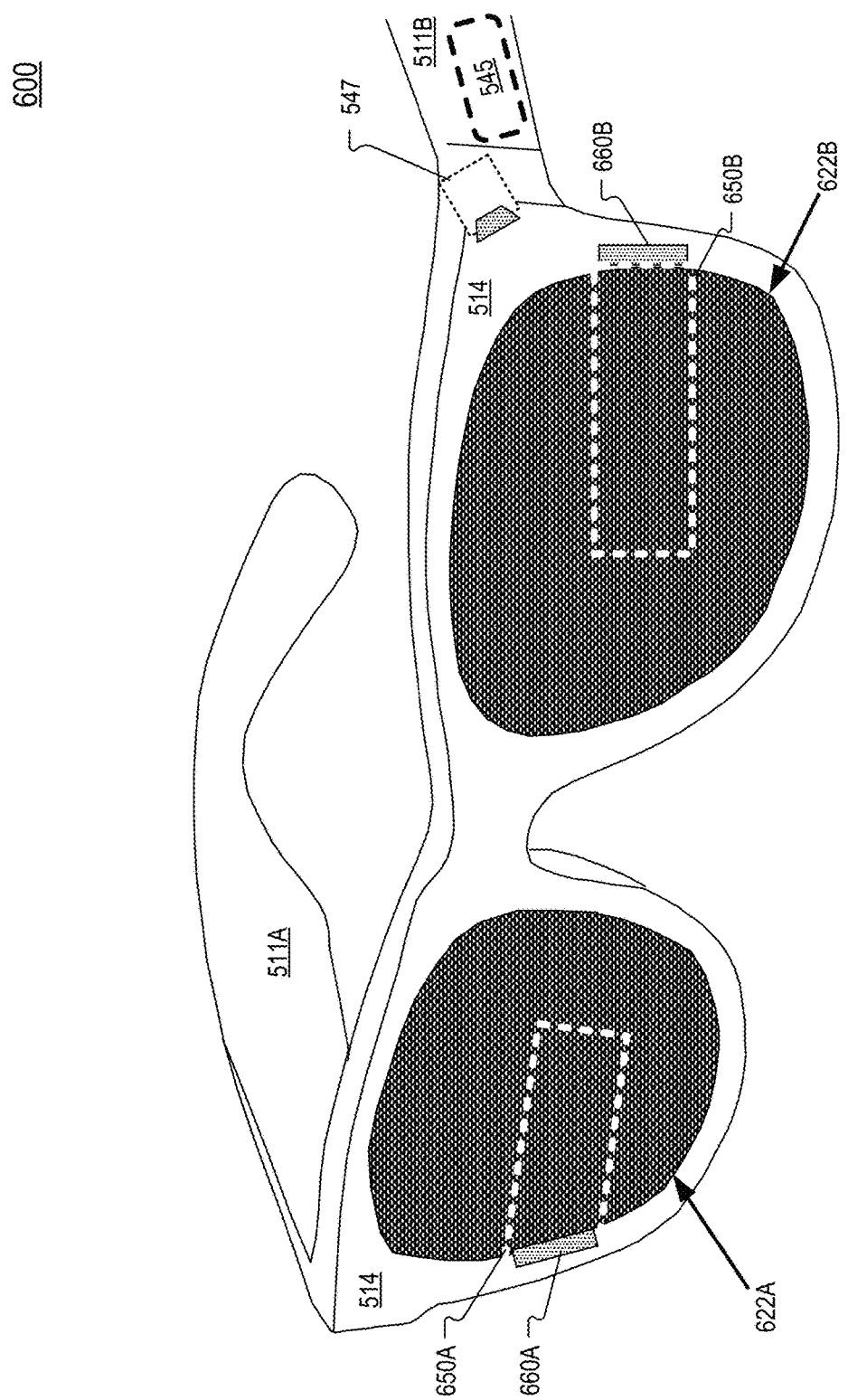
FIG. 6 illustrates a head mounted display (HMD) that includes photochromic optical elements, in accordance with an embodiment of the disclosure.

FIG. 6 illustrates a head mounted display (HMD) 600 that includes photochromic optical elements 622, in accordance with aspects of the disclosure. In FIG. 6, photochromic optical element 622A include a waveguide 650A to direct image light generated by display 660A to an eye of a user. Photochromic optical element 622B may also include a waveguide 650B to direct image light generated by display 660B to an eye of a user. Therefore, in some embodiments, photochromic optical elements include a waveguide 650 to present images to an eye of a wearer of HMD 600. The waveguide 650 may be disposed on an eyeward side of eyeward transparent boundary layer 220 of the photochromic optical element 200. HMD 600 may include alternative display optical elements (not illustrated) to facilitate display architectures that do not necessarily use a waveguide to present images to an eye of a wearer of HMD 600. For example, HMD 600 may utilize a holographic display to present images to an eye of a wearer of HMD 600.

Figure 7:
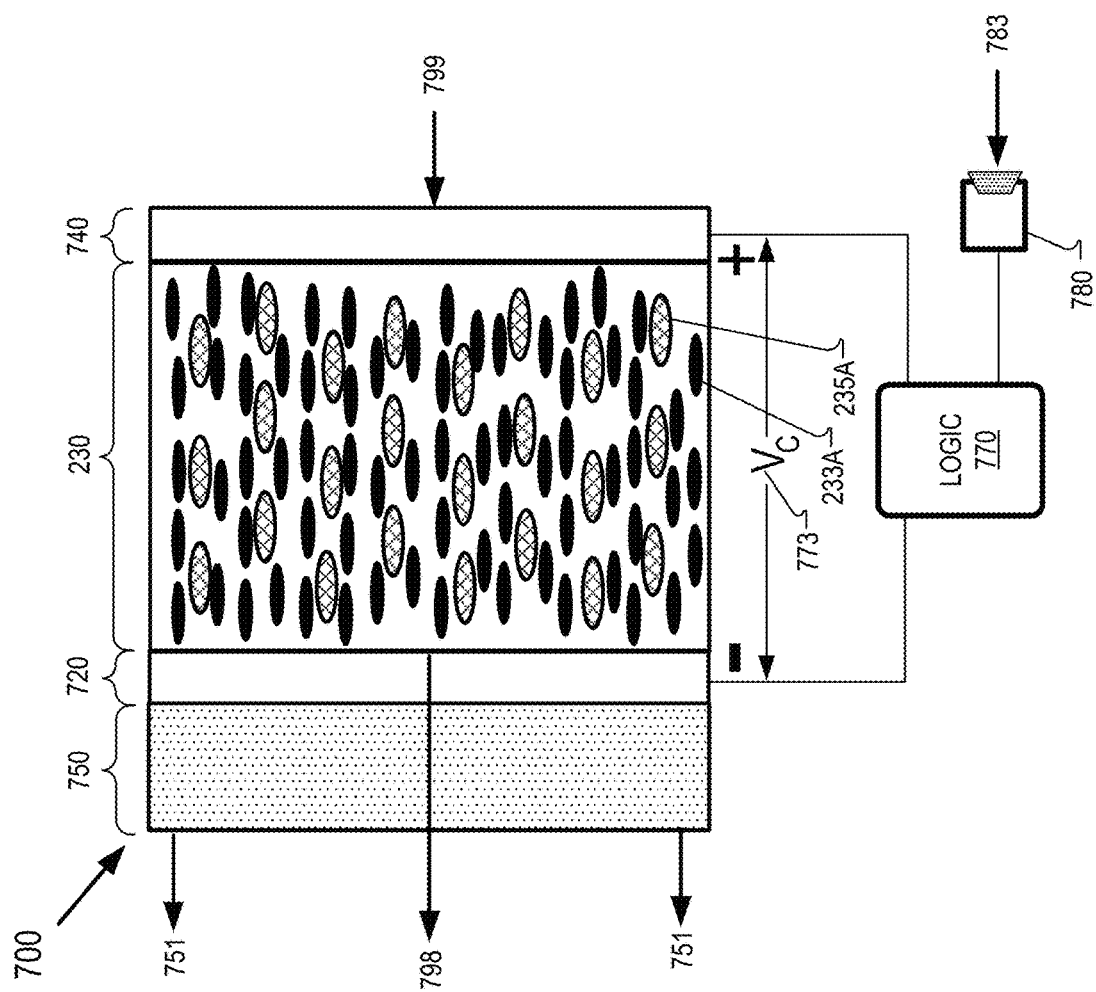
FIG. 7 illustrates a top view of a photochromic optical element that includes a waveguide, in accordance with an embodiment of the disclosure.

FIG. 7 illustrates a top view of photochromic optical element 700 that includes a waveguide 750, in accordance with aspects of the disclosure. Waveguide 750 is disposed on an eyeward side of transparent layer 720. Waveguide 750 directs image light 751 in an eyeward direction to present images to an eye of a wearer of an HMD (e.g. HMD 600). In FIG. 7, photochromic optical element 700 includes a first transparent conductive layer 720 and a second transparent conductive layer 740. First transparent conductive layer 720 and second transparent conductive layer 740 may be indium tin oxide (ITO), for example.

Processing logic 770 may be configured to drive a voltage $V_c$ 773 across first transparent conductive layer 720 and second transparent conductive layer 740 to control an alignment of the liquid crystals 235 with respect to first transparent conductive layer 720 and second transparent conductive layer 740. Processing logic 770 may include appropriate transistors to facilitate driving voltage $V_c$ 773 across first transparent conductive layer 720 and second transparent conductive layer 740. Processing logic 770 may be configured to drive a digital voltage $V_c$ 773 (e.g. 0 VDC or 3.3 VDC) across first transparent conductive layer 720 and second transparent conductive layer 740, where the digital-high voltage functions to align the long axes of liquid crystals 235 normal to first transparent conductive layer 720 and second transparent conductive layer 740 and the digital-low voltage allows the liquid crystals 235 to become disordered.

In some embodiments, processing logic 770 may drive a grey-level analog voltage $V_c$ 773 (e.g. variable voltage between 0 VDC and 3.3 VDC) across first transparent conductive layer 720 and second transparent conductive layer 740 to facilitate more granular control over the alignment of liquid crystals 235. In this embodiment, the higher the voltage $V_c$ 773, the more the long axes of the liquid crystals would be aligned normal to first transparent conductive layer 720 and second transparent conductive layer 740, as illustrated in FIG. 7. In contrast, the lower the voltage $V_c$ 773, the more disordered the liquid crystals 235 become.

Regardless of whether processing logic 770 drives a digital or grey-level voltage $V_c$ 773 across first transparent conductive layer 720 and second transparent conductive layer 740, processing logic 770 may drive voltage $V_c$ 773 in response to a light signal received from sensor 780. Sensor 780 may be configured to receive and measure ambient light 783 from an external environment of the optical element 700. Processing logic 770 is configured to receive the light signal from sensor 780. In one embodiment, sensor 780 is a photodiode generating an electrical current corresponding to an intensity of ambient light 783. In some embodiments, sensor 780 includes a complementary metal-oxide semiconductor (CMOS) image sensor generating an image and processing logic 770 derives an intensity of ambient light 783 from pixel values of the image.

Whether processing logic 770 drives a digital or grey-level voltage $V_c$ 773 across first transparent conductive layer 720 and second transparent conductive layer 740, processing logic 770 is configured to control the alignment of the liquid crystals 235 and thus the transmission of incoming light 799 by way of oblong photochromic dye molecules 233 (and corresponding cross-sections facing incoming light 799) aligning with liquid crystals 235. The remaining light 798 (the portion of incoming light 799 that is not absorbed by oblong photochromic dye molecules 233) propagates through waveguide 750 and continues toward an eye of a wearer of a head mounted device.

In some embodiments, processing logic 770 may have a default state of driving 0 VDC as voltage $V_c$ 773 and allowing solution 230 to passively control the transmission of incoming light 799 with respect to heat, as described in association with FIGS. 2A-4C. Processing logic 770 may change to an active state that drives a voltage $V_c$ 773 in order to align or partially align liquid crystals 235. In one context, a wearer of a head mounted device that includes optical element 700 is in an outdoor environment in bright sunlight that activates oblong photochromic dye molecules 233 into a darkened (absorbing) state. Then the wearer of the head mounted device changes to an indoor environment without bright sunlight. In this scenario, optical element 700 may remain darkened or partially darkened for several seconds or even minutes. However, processing logic 770 may drive a digital-high voltage as voltage $V_c$ 773 to align liquid crystals 235 and consequently minimize or greatly reduce the cross-section of oblong photochromic dye molecules 233 that would absorb incoming light 799. In this way, the active state of processing logic 770 reduces the time that optical element 700 remains darkened, upon a user entering an indoor environment where the darkening may no longer be needed. Processing logic 770 may determine an environment switch from an outdoor environment to an indoor environment based on a sudden drop of intensity of a light signal received from sensor 780, for example.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. 545 or 770) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A head mounted device comprising:
a frame; and
an optical element mounted in the frame, the optical element comprising:
a scene-side boundary layer;
an eyeward boundary layer; and
a solution disposed between the scene-side boundary layer and the eyeward boundary layer, the solution including liquid crystals co-mingled with photochromic dye molecules, wherein the photochromic dye molecules are matched to the liquid crystals to provide a first cross-section of the photochromic dye molecules at a first coordinate of the optical element having a first temperature, and wherein the photochromic dye molecules are matched to the liquid crystals to provide a second cross-section of the photochromic dye molecules at a second coordinate of the optical element having a second temperature.

2. The head mounted device of claim 1, wherein the first cross-section is less than the second cross-section and the first temperature is less than the second temperature.

3. The head mounted device of claim 1, wherein the first coordinate is approximately in a middle of the optical element, and wherein the second coordinate is approximately on an outside edge of the optical element.

4. The head mounted device of claim 1, wherein a difference between the first temperature and the second temperature is between five degrees Celsius and ten degrees Celsius.

5. The head mounted device of claim 1, wherein a first refractive index of the liquid crystals is substantially equal to a second refractive index of the photochromic dye molecules.

6. The head mounted device of claim 1, wherein the liquid crystals are rod-shaped liquid crystal molecules.

7. The head mounted device of claim 1, wherein the optical element further includes a display optical element configured to present images to an eye of a wearer of the head mounted device.

8. The head mounted device of claim 1, wherein the photochromic dye molecules are oblong.

9. The head mounted device of claim 1, wherein the scene-side boundary layer and the eyeward boundary layer are transparent.

10. An optical element comprising:
   a first boundary layer;
   a second boundary layer; and
   a solution disposed between the first boundary layer and the second boundary layer, the solution including liquid crystals co-mingled with photochromic dye molecules, wherein the photochromic dye molecules are matched to the liquid crystals to offset a decrease in absorption of the photochromic dye molecules in response to a temperature increase of the photochromic dye molecules.

11. The optical element of claim 10, wherein, in response to the temperature increase, the photochromic dye molecules of the solution are configured to increase a cross-section of the photochromic dye molecules with respect to incoming light.

12. The optical element of claim 10, wherein the photochromic dye molecules are matched to the liquid crystals to offset an increase in absorption of the photochromic dye molecules in response to a temperature decrease of the photochromic dye molecules, wherein the temperature decrease is from an ambient air temperature surrounding the optical element.

13. The optical element of claim 10, wherein the temperature increase is an increase from an ambient air temperature surrounding the optical element.

14. The optical element of claim 10, wherein the liquid crystals are configured to become increasingly disordered in response to the temperature increase.

15. The optical element of claim 10, wherein the photochromic dye molecules are oblong.

16. A head mounted device comprising:
   a first transparent conductive layer;
   a second transparent conductive layer;
   a solution disposed between the first transparent conductive layer and the second transparent conductive layer, the solution including liquid crystals co-mingled with photochromic dye molecules, wherein the photochromic dye molecules are matched to the liquid crystals to offset a decrease in absorption of the photochromic dye molecules in response to a temperature increase of the photochromic dye molecules; and
   processing logic configured to drive a voltage across the first transparent conductive layer and the second transparent conductive layer to control an alignment of the liquid crystals.

17. The head mounted device of claim 16 further comprising:
   a sensor configured to generate a light signal, wherein the processing logic is further configured to drive a voltage level across the first transparent conductive layer and the second transparent conductive layer based on an intensity drop of the light signal received from the sensor, wherein the voltage level drives the liquid crystals in the solution to increase an alignment of the liquid crystals between first transparent conductive layer and the second transparent conductive layer.

18. The head mounted device of claim 16, wherein increasing the voltage across the first transparent conductive layer and the second transparent conductive layer increases a light transmission by increasing an alignment of the liquid crystals between the first transparent conductive layer and a second transparent conductive layer.

19. The head mounted device of claim 16, wherein a first refractive index of the liquid crystals is substantially equal to a second refractive index of the photochromic dye molecules.

20. The head mounted device of claim 16, wherein the first transparent conductive layer and the second transparent conductive layer include indium tin oxide (ITO).

* * * * *